United States Patent
Dudt et al.

(10) Patent No.: US 8,114,474 B1
(45) Date of Patent: Feb. 14, 2012

(54) FORMING BALLISTIC ALUMINUM ARMOR USING COLD SPRAYING AND FRICTION STIRRING PROCESSES

(75) Inventors: Philip J. Dudt, Rockville, MD (US); David R. Forrest, Washington, DC (US); Jennifer N. Wolk, Alexandria, VA (US); Stephen Szpara, Hagerstown, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/164,804

(22) Filed: Jun. 21, 2011

(51) Int. Cl.
*B05D 1/02* (2006.01)
*B05D 3/12* (2006.01)

(52) U.S. Cl. ........ 427/201; 427/191; 427/192; 427/193; 427/369

(58) Field of Classification Search .......... 427/191–193, 427/201, 369
See application file for complete search history.

(56) References Cited

U.S. PATENT DOCUMENTS

| | | | |
|---|---|---|---|
| 6,780,458 B2 | 8/2004 | Seth et al. | |
| 7,163,138 B1 | 1/2007 | Dudt et al. | |
| 7,482,065 B2 * | 1/2009 | Branagan | 428/635 |
| 7,597,236 B2 | 10/2009 | Tolle et al. | |
| 2004/0265503 A1 | 12/2004 | Clayton et al. | |
| 2008/0041921 A1 * | 2/2008 | Creehan et al. | 228/101 |

OTHER PUBLICATIONS

G. Liu, L.E. Murr, C-S Niou, J.C. McClure and F.R. Vega, "Microstructural Aspects of the Friction-Stir Welding of 6061-T6 Aluminum", Scripta Materialia, vol. 37, No. 3, pp. 355-361 (1997).
I. Boromel, L. Ceshini, A. Morri and G.L. Garagnani, "Friction Stir Welding of Aluminum Based Composites Reinforced with A1203 Particles: Effects on Microstructure and Charpy Impact Energy", Metallurgical Science and Technology, vol. 24. No. 1 (1983).

* cited by examiner

*Primary Examiner* — Frederick Parker
(74) *Attorney, Agent, or Firm* — Richard A. Morgan

(57) ABSTRACT

A metallic glass particle layer is applied to aluminum alloy armor and friction stir mixed into the surface in order to embed the material into the armor and to take advantage of its exceptional hardness. An advantage of the invention is that the hard material is an integral part of the armor, included within the body of the armor plate and not merely a surface coating. The advantage of the friction stir process is that it generates relatively low levels of heat and magnetic measurements show that the amorphous phase condition of the metallic glass is not deteriorated. The armor may be tempered to improve properties.

8 Claims, 2 Drawing Sheets

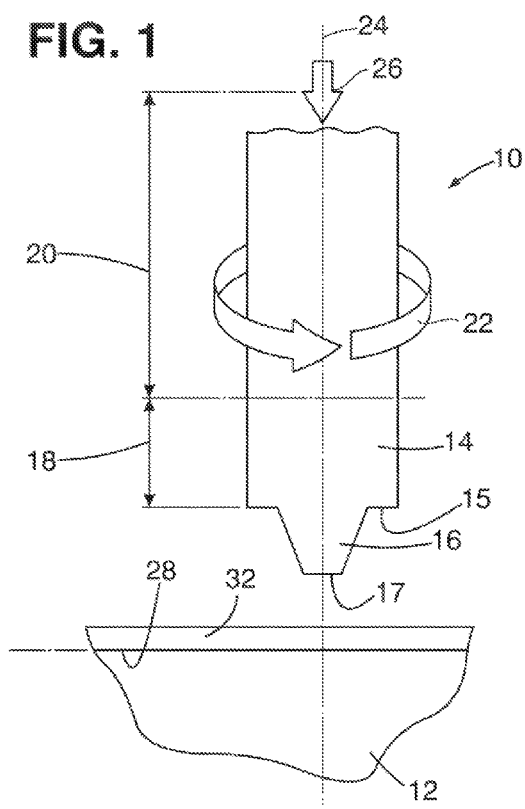
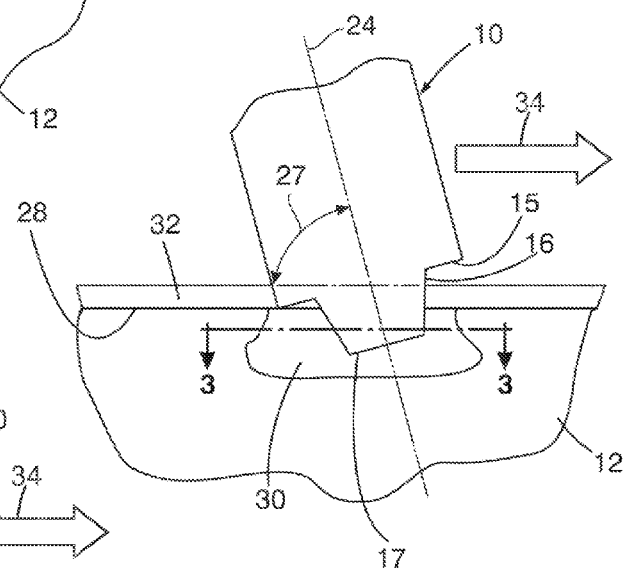
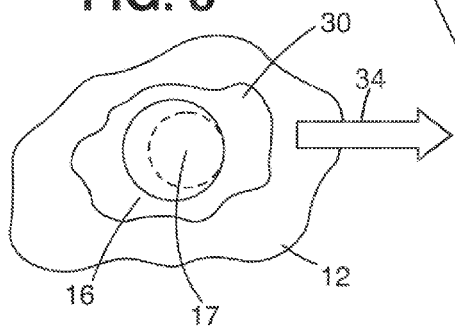

FORMING BALLISTIC ALUMINUM ARMOR USING COLD SPRAYING AND FRICTION STIRRING PROCESSES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to ballistic armor. More particularly the invention relates to ballistic armor made by cold gas dynamic spraying a coating of hard particles onto an aluminum armor plate followed by friction stirring the coating into the aluminum armor plate.

2. Discussion of the Related Art

Ballistic armor made of aluminum alloy is used by the military for applications for which excess weight limits usefulness. One application is the aluminum alloy armor on armored personnel carriers and other military vehicles for which the carrying capacity is limited by weight. Another application is the hulls and armor on small combatant craft.

Use of ballistic grade aluminum has increased due to the ballistic performance of this low density metal when used as primary armor on combat vehicles and support vehicles. These materials are resistant to small arms projectiles and explosion fragments. Ballistic grade aluminum armor is also resistant to explosive blasts and multiple fragment impacts from improvised explosive devices. An aluminum alloy of interest is the alloy 5083 in both wrought plate (MIL-DTL-46027J) and extruded form (MIL-DTL-46083D). Alloy 5083 non-heat treatable wrought aluminum derives its properties from strain-hardening by rolling. Other aluminum alloy armors have been investigated.

Some aluminum armor alloys in use are alloy 5083 and alloy 5456 meeting the requirements of U.S. Military Specification MIL-A-46027J (MR), and alloy 7039 meeting the requirements of U.S. Military Specification MIL-A-46063H (MR).

The primary wrought aluminum alloy used in U.S. combat vehicles is aluminum-magnesium alloy 5083 defined by mechanical properties, corrosion requirements and ballistic standards specified in MIL-DTL-46027J (MR). The ballistic, standard is similar for related alloy 5456 that is used primarily in naval applications. The specification sets the minimum ballistic requirements for thicknesses from 6.35 mm (0.25 inch) to 76.2 mm (3.00 inch) that must be met to be certified under the military standard. The primary strengthening method for commercial grade alloy 5083 is strain hardening by rolling and tempering. The main strain-hardened tempered alloys are 5083-H131 and 5083-H321.

Some commercially available heat-treatable aluminum alloys used for appliqué do not have a military specification for ballistics. Aluminum-silicon-magnesium alloy 6061 with 16 heat treating is referred to as aluminum alloy 6061-16. Other alloys include aluminum-copper alloy 2024-1351 and aluminum-zinc alloy 7075-T6. Alloy 7075 is similar to alloy 7039, but higher in strength. There has also been interest in the commercially available aluminum alloy Alustar 5059-H131 which is in the same family as the 5083/5456 alloys.

Amorphous metals, referred to herein as metallic glass, have remarkable physical properties. These amorphous metals and alloys have a non-crystalline high-temperature amorphous structure at room temperature. The more common microstructure of these metals is a polycrystalline solid at room temperature.

Amorphous metals are formed by cooling a liquid melt very rapidly to avoid formation of the polycrystalline state. Rapid quenching circumvents the finite amount of time required to generate a solidified, polycrystalline phase morphology. For this reason amorphous metals are normally found in the form of powders, fibers, or thin ribbons. The high surface-to-volume ratio of these forms allows rapid cooling of the molten metal and retention of the amorphous phase which is retained by the lack of atomic mobility at room temperatures. There are also some special amorphous metal alloys that contain many variable atomic sizes which retard crystalline formation and can be fabricated in thicker, centimeter size dimensions.

Because amorphous alloys do not have grain boundaries, dislocations, or other typical polycrystalline features, they frequently demonstrate very high hardness and strength. For some metallic glasses the strength is on the order of 250 ksi (1700 MPa). In some compositions there is a high co-efficient of restitution demonstrating rapid rebound between loading and unloading with nearly complete recovery.

While amorphous metals exhibit a number of remarkable properties including hardness, strength and restitution; they also exhibit much less ductility under certain kinds of loading and can shatter at high impact. One possibility of taking advantage of their mechanical and electromagnetic capabilities and avoiding the shattering problem is to embed them in a more ductile matrix.

Explosive compaction has been tried to embed metallic glass in aluminum or aluminum matrices. However, materials fabricated by compaction contain a greater number of internal defects because the particulates that form the compacted material are not in contact on all surfaces as would occur in a fluid environment that promotes wetting and mixing of the components. A compacted structure, though improved over a more brittle glassy phase, still exhibits rather low shatter resistance. Also the explosive process has limitations due to pulverizing the metallic glass at higher explosive compaction levels. Rather high hardness values for compacted material of up to about Rockwell hardness 65 were obtained with incorporation of 16 volume % metallic glass.

Amorphous metals have been mixed into kinetic energy penetrators by extrusion in an effort to replace depleted uranium. The strength and self-sharpening characteristics of the amorphous metals were useful for this application. The process was expensive and included a very dense, high cost amorphous metal comprising zirconium, columbium, nickel, copper and aluminum.

I. Boromel, L. Ceschini, A. Morri and G. L. Garagnani, "Friction Stir Welding of Aluminum Based Composites Reinforced with A1203 Particles: Effects on Microstructure and Chirpy Impact Energy", Metallurgical Science and Technology, vol. 24. No. 1 (1983) reports that aluminum alloy 6061 was impregnated with 20 volume % microscopic alumina ($Al_2O_3$) particles by high energy mixing of the alumina powder in molten aluminum before casting. This was followed by T6 heat treatment.

There is a continuing need in the art for improvements in ballistic aluminum armor.

SUMMARY OF THE INVENTION

A ballistic aluminum armor is made by a process. An aluminum armor surface is coated with metallic glass powder by cold gas dynamic spraying to form an intermediate coating layer. The intermediate coating layer is embedded below the surface by friction stirring. The result is a ballistic aluminum armor.

BRIEF DESCRIPTION OF THE DRAWINGS

A more complete appreciation of the invention and many of its attendant advantages will be readily appreciated as the same becomes better understood by reference to the following detailed description when considered in connection with the accompanying drawing wherein:

FIG. 1 is a partial side view of a friction stir mixing pin tool positioned above a portion of a metallic substrate.

FIG. 2 is a partial side view of the friction stir mixing pin tool shown in FIG. 1, inserted into the metallic substrate.

FIG. 3 is a partial section view taken along a plane indicated by section line 3-3 in FIG. 2.

DETAILED DESCRIPTION OF THE INVENTION

Figure 4:
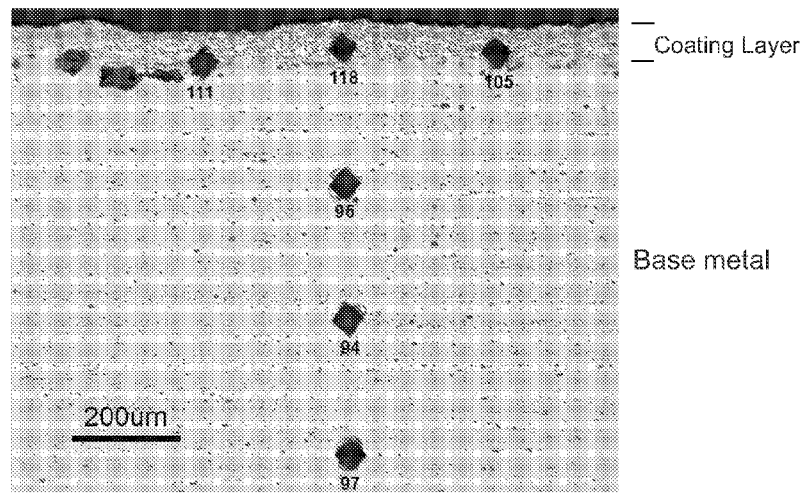
FIG. 4 is a photomicrograph of a cross-sectional view of a powder mixture deposited on an aluminum alloy plate by cold spraying.

Amorphous metallic glasses exhibit remarkable hardness and strength. Some metallic glasses have harnesses in the order of 250 ksi (1700 MPa). Some metallic glasses demonstrate a coefficient of restitution with a very rapid rebound between the loading and unloading and nearly complete recovery. However, others exhibit less ductility at certain kinds of loading and at high impact levels, they can shatter. Inventors have essentially overcome the problem of shattering by embedding amorphous metallic glass in a more ductile ballistic armor.

According to the invention amorphous metallic glass powder is applied to the surface of an aluminum armor by cold spraying to form an intermediate coating layer that adheres to the surface. A typical amorphous metallic glass powder composition has a weight ratio of aluminum: steel glass of about 4:1 to about 1:4, preferably 4:1 to 1:1. The intermediate coating is about 5 to about 3000 micro meters thick. The intermediate coating layer is forced below the surface by friction stirring to a depth of about 20 micrometers to about 5000 micrometers. This forms ballistic aluminum armor.

Cold gas dynamic spray refers to a method of coating a surface by spraying particulate powders at relatively low temperature using a supersonic carrier gas. The particulate powders have a size in the general range of 1 to 50 micrometers. The powder particles are accelerated by carrier gas at supersonic velocities of about 300 to 1,200 meters/second. The powder particles deform on impact to adhere to the surface. Adhesion of less malleable particles is enhanced by the inclusion of relatively malleable particles in a powder mixture. Carrier gas temperature, carrier gas velocity and powder particle size are variables that are optimized within known limits.

Optimization of cold gas dynamic spraying variables is done within general limits of the materials to be processed. The temperature of the carrier gas must be lower than the melting temperature or the softening temperature of the accelerated powders. The size of the accelerated powders is about within 1 to 50 micrometers. The speed of the powder in the carrier gas is about 300 to 1,200 meters/second depending on material and the size of powders. Carrier gas is at a velocity of Mach 2 to 4 and 1 to 3 MPa pressure. The carrier gas is typically air, nitrogen, helium or a gas mixture with constituents selected from air, nitrogen, and helium. Whatever gas is used, adhesion is possible only when the velocity of accelerated powder particles exceeds a critical velocity.

The powder particles are mechanically bonded to the surface deformation caused by impact. However, metallic glass particles of the invention are hard and resistant to deformation. For this reason, the metallic glass particles are mixed with a malleable metal powder to form a powder mixture. Aluminum particles are often used as the malleable metal powder. Aluminum particles are preferred for this invention. Other suitable malleable metal powders include powders of stainless steel, nickel, copper and chromium. Selection of malleable powder is made to achieve a desirable intermediate coating layer adhesion and for compatibility with the composition of the underlying aluminum alloy armor.

The resulting intermediate coating, indicated in FIG. 1 as layer 32, has a thickness of up to about 6 mm.

One metallic glass is commercially available from NanoSteel Company, Inc., Providence, R.I. 02903 as SHS 7574FP1 amorphous steel alloy powder. Composition of SHS 7574FP1 amorphous steel alloy powder is iron and:

Chromium <25 wt %
Molybdenum <20 wt %
Tungsten <10 wt %
Boron <5 wt %
Manganese <5 wt %
Carbon <3 wt %
Silicon <2 wt %

The particle size of the metallic glass is −15 microns. This includes the distribution of sizes chat pass through a 15 micrometer screen.

The micro hardness (HV 300) is 975 so 1075 kg/mm$^2$. Density is 7.65 grams/cm.

Friction stir mixing as referred to herein is friction stir welding applied to mixing a particulate metal overlying coating layer with the underlying aluminum armor plate. In the process, a cylindrical, pin tool comprising a shoulder and a pin is rotated about an axis at constant angular velocity. The pin tool pin is inserted into the aluminum armor to the shoulder so that both the pin and shoulder are in intimate contact with both. The rotating pin tool is also traversed at a constant rate along a plane defined by the contact plane of the two work pieces. Plasticized metal from the overlying particulate coating layer is moved into the underlying aluminum armor by the rotating pin tool, thereby stirring the particulate metal into the underlying aluminum armor plate. Depth of stirring is determined by the depth of the pin and by the applied pressure on the pin tool. The mixing depth extends only slightly more than the pin tool pin depth. As a result the overlying coating layer is mixed into the underlying aluminum armor layer to a depth determined by the pin of the pin tool. The joining is entirely by mechanical mixing and in the absence of melting.

Friction stir mixing is an entirely solid state process. Frictional heating plasticizes the metals in the vicinity of the rotating pin without melting. However, heating to the point of melting of either of the two metals is purposely avoided. According to the invention friction stir mixing is used to mix an intermediate coating layer under the surface of an aluminum alloy armor plate.

There are five process parameters in the friction mixing process. They are pin tool rotation speed, traverse speed, pin tool depth of penetration, tilt angle and axial pressure or shoulder depth. Process parameters are adjusted to control the depth and uniformity of dispersion of metallic glass particles below the surface of the ballistic aluminum alloy armor.

Reference is made to the drawing in detail. FIG. 1 illustrates a friction stir mixing pin tool 10 positioned in spaced relation above a ballistic aluminum alloy metal work piece 12. The pin tool 10 has an axially elongated cylindrical body 14 with a lower axial end having a shoulder 15, from which a downwardly convergent pin 16 extends to an end surface 17. In FIG. 1 a lower axial end section 18 of the pin tool body 14 is constructed of a material such as ceramics or layered steel that is softer and more easily ablated than an upper section 20 made of harder, ablation resistant layered steel material. The pin tool 10 undergoes rotation 22 about its cylindrical axis 24 while axial pressure 26 is applied to as the pin tool pin 16 is inserted into a surface 28 of the ballistic aluminum armor metal substrate 12 at an inclination angle 27 as shown in FIG. 2 to contact shoulder 15 with surface 28. A metal powder mixture of metallic glass particles has been deposited by cold spraying as a layer 32 onto the surface 28. The hard particles enter a stir zone 30 of plasticized metal established within the ballistic aluminum alloy work piece 12 as shown in FIG. 2 and in FIG. 3. Stirring of the metallic glass particles below surface 28 is effected below the melting temperature of the ballistic aluminum alloy work piece 12 and below the crystallization temperature of the metal powder by the rotation 22 of the pin tool 10 including shoulder 15 under the axial pressure 26 to mix the metallic glass particles from layer 32 together with any admixed alloys into the aluminum alloy armor work piece 12.

The stirring pin tool 10 is traversed in a direction 34 as shown in FIG. 2 to apply metallic glass particles below the entire surface 28 of the ballistic aluminum alloy work piece 12.

The micro-structural character of friction stirred. 6061-T6 aluminum without any amorphous metal is known. Friction stir mixing of 6061-T6 produces a maximum temperature near the top surface of about 250° C. (480° F.) This is well below the crystallization temperature range above 590° C. (1090° F.), so the particles remain amorphous. The hardness of the 6061-T6 base plate is in the order of HV 100. This is consistent with the HV 95 value we measured.

The stirred zone depth was approximately equal to the pin length of 5 mm. The mixed region, incorporating the amorphous steel particles, measured approximately 400 µm deep. The hardness of the stirred zone was HV 73, and the hardness of the mixed region with amorphous steel particles measured HV 86. The hardness of the base plate (HV 95) was higher than either of these stirred and mixed regions.

Hardness, and therefore strength, of the 6061-T6 aluminum plate was reduced in the friction stir mixing region. The reduction in hardness is consistent with the fact that this aluminum alloy develops its strength from heat treatment. Additional heat treatment can be applied if the strength loss is not acceptable. Additional strength increases can also be achieved with higher volume fractions of metallic glass particles.

I. Boromel, L. Ceschini, A. Morri and G. L. Garagnani, "Friction Stir Welding of Aluminum Based Composites Reinforced with A1203 Particles: Effects on Microstructure and Charpy Impact Energy", Metallurgical Science and Technology, vol. 24. No. 1 (1983) reports that the grain size decreased by a factor of 10 from roughly 100 micrometers to 10 micrometers in the mixed region. The decrease in grain size was attributed to the formation of new grains caused by recrystallization of aluminum alloy during friction stirring. We found some aluminum alloy grain refinement. However, this reduction was found to be much less, i.e. 29 micrometers to 20 micrometers. The micro alumina particulates had probably already gone through grain refinement so that grain size was not significantly decreased by friction stir mixing.

A micro indentation hardness survey of the mixed region without metallic glass particles showed that hardness toward the edges of the mixed region was as high as HV 95. At the lower center of the mixed region the hardness value was as low as HV 40 and near the surface was HV 55. It is apparent that some lowering of hardness can be expected in the stirred region with or without metallic glass particles. In our work the hardness was lowered to HV 86 in the 200 µm region where the amorphous metal powder was mixed.

Tensile tests are reported for friction stir mixing alumina particles with 6061-T6 aluminum armor. Friction stirring resulted in a decrease in tensile stress by 43% (49.3 to 28.0 ksi) and decrease in ultimate strength of 28% (52.8 to 38.0 ksi). The elongation to failure increased by about 64% (1.7% to 2.8%).

I. Boromel, L. Ceschini, A. Morri and G. L. Garagnani, "Friction Stir Welding of Aluminum Based Composites Reinforced with A1203 Particles: Effects on Microstructure and Charpy Impact Energy", Metallurgical Science and Technology, vol. 24. No. 1 (1983) report improved ballistic performance with mixed hard particles, despite the reduced hardness and strength in the stir zone. In the report, aluminum alloy 6061-T6 was reinforced with 20 volume % friction stir mixed alumina particles. It was found that friction stir mixing increased the initiation energy for fracture by 60%, the energy for fracture propagation by 140%, and the dynamic yield strength by 13% from 6.2 ksi to 7 ksi.

Metallic glass particles are friction stirred into the surface of aluminum armor in order to embed the material into the armor to take advantage of its exceptional hardness. An advantage of the invention is that the hard material becomes an integral part of the armor and not merely a surface coating. The advantage of the friction stirring is that it operates at relatively lower temperatures and the amorphous phase condition of the metallic glass is not deteriorated. It has been shown in metallic glass that 593.3° C. (1100° F.) is the temperature at which the amorphous phase begins to crystallize to form a softer phase. The friction stirring process heats the aluminum alloy to a temperature of only about 260° C. (500° F.) The friction stir mixed 6061-T6 aluminum armor can be strengthened by solution heat treating at 985° F., quenched and then aged at 350° F.

The invention is shown by way of example.

EXAMPLE

Base metal—0.375 inch thick 6061-T6 rolled plate. The planar dimension of she deposited regions was 4 inches×4 inches.

A micron size powder was accelerated to a speed of 700 to 1000 meters/second in an inert carrier gas. Two powder compositions were used.

Powder Composition 1—amorphous steel alloy powder (NanoSteel® SHS 7574 HVOF)
  Deposited 8 micrometers thick.
Powder Composition 2—blended powder
  65 weight % aluminum/chromium alloy powder (Al-trans®)
  35 weight % NanoSteel® SHS 7574 HVOF steel alloy powder
  Deposited 63 micrometers thick.
Cold Spray Parameters
  Powder fluidizing unit flow rate set point 3.3 lb/hr
  Powder fluidizing unit pressure 65 psi Thermal conditioning unit temperature set point 400° F.
Thermal conditioning unit pressure set point 60 psi
Spray width, 4 inches
Spray length, 4 inches
Sweep velocity 5.0 inches/second.
Stroke/step 2.048 inches—right to left direction.
Layers-5 layers deposited for each step size.
Step size, 0.032
Gas—helium @500 psi.
Tap Density, 2.08; sieve hold size, 5/64-inch.
Powder flow rate set point, 28 grams/minute.
Friction Stir Mixing Parameters
  Traverse travel speed, 9.45 inches/minute
  Rotation rate, 700 rpm
  Shoulder diameter, 21 mm
  Pin depth, 5 mm
  Position Control
    3 raster passes, stepping 0.125 inches/pass
    z-force measured 3000-5000 lbs. (approx) during passes.

Example 1

Comparative

100% Amorphous Steel Alloy Powder

A 100% amorphous steel alloy powder was deposited by cold spraying on the aluminum base plate. The powder did not adhere well. Thickness of the deposited layer was measured and found to be 8 micrometers thick. Based on experience this was judged to be insufficient powder to improve the ballistic physical properties of the aluminum alloy armor. The powder was not mixed into the plate.

Example 2

Blended Powder

The blended powder was deposited on the base metal by cold spraying to form a layer. A transverse section through the thickness was made. Hardness measurements were made. The cross section was polished and photographed through a microscope to produce the photomicrograph shown in FIG. 4. As-deposited, the blended powder layer was measured as approximately 63 micrometers thick. The surface layer and base metal micro structural regions were hardness tested using Vickers (HV) micro indentations as well as Rockwell superficial hardness. The micro indentations and their measured hardness values printed next to the indentations are seen on the photomicrograph in FIG. 4. The hardness results are reported in Table 1.

TABLE 1

Hardness Measurements-Blended Powder Averages

|  | Micro-hardness Measurements on Transverse Metallographic Sample | Rockwell Superficial Hardness Measurements on Surface |
|---|---|---|
| Base metal before friction stir mixing into surface | HV 95 | HR15T 76 |
| Stirred metal after friction stir mixing into surface | HV 73 | — |
| Cold spraying surface | HV 111 | HR15T 76 |
| Surface after cold spraying and friction stir mixing | HV 86 | HR15T 71 |

Figures 5, 6:
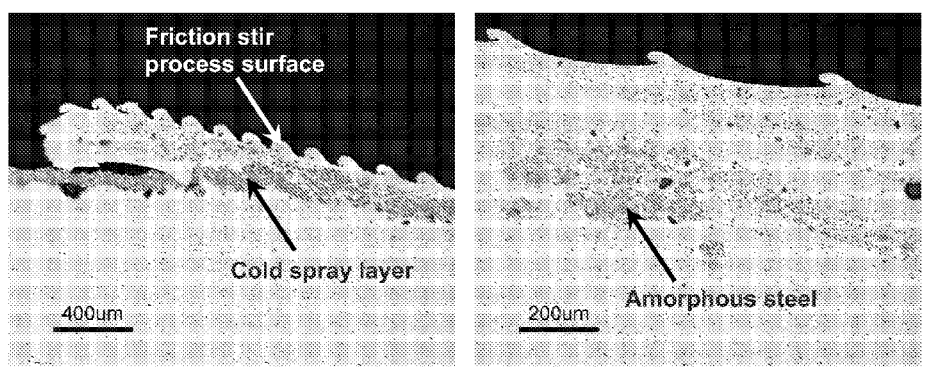
FIG. 5 is a photomicrograph of a cross-sectional view of an embedded intermediate coating after one pass with a friction stir mixing pin tool.
FIG. 6 is a photomicrograph of a cross-sectional view of an embedded intermediate coating after three passes with a friction stir mixing pin tool.

The blended powder was mixed into the surface using friction stir mixing, and transverse cross sections were metallographically prepared. The depth of mixing was measured to be approximately 200 micrometers after one mixing pass. The plate was cross-sectioned after one pass. The cross section was polished and photographed through a microscope to produce the photomicrograph shown in FIG. 5. The depth of mixing was measured to be approximately 400 micrometers after three passes. The plate was cross-sectioned after three passes. The cross section was polished and photographed through a microscope to produce the photomicrograph shown in FIG. 6. Different micro structural regions were hardness tested using Vickers (HV) micro indentations as well as Rockwell superficial hardness.

The hardness results are summarized in Table 1. They show that the blended powder provides a hard surface region (HV 111) that is incorporated into the material after friction stir mixing (HV 86). Friction stir mixing caused a reduction in hardness in the stir zone compared to the original hardness in the base metal (from HV 95 to HV 73), for a net loss of surface hardness from HV 95 to HV 86. The Rockwell Superficial measurements taken on the surface plane showed no difference between the coated and uncoated surfaces; therefore Rockwell Superficial testing was not an effective method to measure surface hardness increases for this process and for the thickness of surface layer deposited.

Example 3

Magnetic characteristics of the ballistic aluminum alloy armor were assessed to determine if there were changes in the ballistic aluminum armor after cold spraying and friction stir mixing. Four samples were taken. The first was a sample of unsprayed amorphous metal powder. The second was aluminum base metal without any amorphous metal. The third was a plate with cold sprayed amorphous metal on the surface without friction stir mixing. The fourth was a plate that had been cold sprayed with amorphous metal and then friction stir mixed into the plate.

The magnetization result for the amorphous powder before spraying was on the order of 55 micro-emu/g. Pure iron has a magnetization level of 218 emu/g or about 3600 times greater. The aluminum evidenced very little ferromagnetic properties as expected. The spray coated aluminum displayed a small amount of ferromagnetic characteristic with a ferromagnetic B-H curve amplitude of 0.2 micro-emu. The friction stirred material evidenced some increase in magnetic characteristics to a level of roughly 1 micro-emu. The friction stirred sample also showed some hysteresis in comparison to the powder which showed no hysteresis.

Magnetic evaluation suggests that there is a small change in the amorphous material, but this does not appear to be a large affect under the process conditions. It also suggests that treatment at higher temperatures might provide a way to adjust magnetic characteristics of the friction stir mixed work piece if desired. Magnetic measurements provided evidence that the steel did not crystallize and remained amorphous.

The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. Ballistic aluminum armor made by the process of:
   a. applying a metallic glass powder to a surface of an aluminum armor by cold gas dynamic spraying an aluminum powder and metallic glass powder mixture to form an intermediate coating layer, and
   b. embedding the intermediate coating layer below the surface by friction stir mixing,
   to form the ballistic aluminum armor.

2. The ballistic aluminum armor made by the process of claim 1 wherein the metallic glass powder comprises steel glass.

3. The ballistic aluminum armor made by the process of claim 1 wherein the metallic glass powder consists of steel glass.

4. The ballistic aluminum armor made by the process of claim 1 wherein the aluminum powder and metallic glass powder mixture comprises aluminum and steel glass in a weight ratio range of aluminum: steel glass of 4:1 to 1:4.

5. The ballistic aluminum armor made by the process of claim 1 wherein the aluminum powder and metallic glass powder mixture comprises aluminum and steel glass in a weight ratio range of aluminum: steel glass of 4:1 to 1:1.

6. The ballistic aluminum armor made by the process of claim 1 wherein embedding is at least about 20 micro meters below the surface of the aluminum armor.

7. The ballistic aluminum armor made by the process of claim 1 wherein embedding is about 20 micrometers to about 5000 micro meters below the surface of the aluminum armor.

8. The ballistic aluminum armor made by the process of claim 1 wherein the intermediate coating is about 5 to 3000 micro meters thick.

* * * * *